Patented May 1, 1945

UNITED STATES PATENT OFFICE 2,374,983

2,374,983

SULPHUR COMPOUNDS

Martin de Simó, Piedmont, and John J. O'Connor, Oakland, Calif., assignors to Shell Development Company, San Francisco, Calif., a corporation of Delaware No Drawing. Application April 29, 1941, Serial No. 390,937

7 Claims. (Cl. 260—455)

This invention is directed to a group of new chemical compounds having technically advantageous properties and broadly includes mercaptans having the thiol group directly attached to a carbon atom to which at least two aliphatic radicals forming an open chain of at least 10 carbon atoms are also directly attached, and mercaptides and esters of such new sulphonic acids.

The new compounds of the invention are monothiols having an open chain of at least 10 carbon atoms which may be represented by the formula

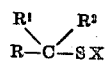

where R represents a hydrogen atom or a saturated hydrocarbon radical, $R^1$ and $R^2$ each represents a hydrocarbon radical and X represents a cation or ester group. A preferred group of the new compounds is that having from 10 to 20 or preferably 10 to 17 carbon atoms per molecule, as these compounds may be oxidized to sulphonic acids which, particularly in the form of their salts, exhibit useful surface active properties to an unusually high degree. Especially useful products are those of the foregoing formula in which R represents hydrogen and preferably those in which $R^1$ and $R^2$ represent aliphatic hydrocarbon radicals having at least 2 carbon atoms.

The new mercaptans may be produced in a number of different ways. One advantageous method is by reaction of the corresponding alkyl halides with a suitable hydrosulphide, for example, the alkali metal hydrosulphides. The reaction is preferably carried out in an alcoholic solution, but other solvents in which both reactants are soluble may also be used. It is also feasible to carry out the process without a solvent by simply heating the chosen hydrosulphide with the alkyl halide while stirring to promote intimate contact therebetween. An excess of hydrogen sulphide during the reaction is advantageous in suppressing side reactions in which sulphides are formed. In order to insure the presence of such excess hydrogen sulphide, it may be desirable to carry the process out under pressure. Any monohalide having the halogen atom attached to a carbon at least once removed from the end of an open chain of at least 10 carbon atoms may be used. The halide employed may be either saturated or unsaturated. In the latter case halides having the halogen atom attached to a carbon atom which is directly joined to no unsaturated carbon atoms are preferably employed. Suitable halides may be obtained by chlorinating paraffins or by addition of hydrogen halides to olefines such as are produced by cracking paraffin wax or the like. Typical of the halides which may be used as starting materials for the new mercaptans of the invention are: 2-chlorodecane, 3-bromoundecane, 3-chlorododecane, 4-chlorotetradecane, 5-bromo-pentadecane, 2-chloro-2-methyl-decane, 3-chloro-3-ethyl-undecane, 7-chloro-7-methyl-tetradecane, 10-chloro-nonadecane, 11-bromo-heneicosane, 12-chloro-12-methyl-tricosane, 2-chloro-tridecene-6, 4-bromo-pentadecene-8, 2-chloro-2-methyl-hexadecene-8, 3-chloro-3-ethyl-octadecene-10, 10-chloro-2-methyl-nonadecene-2, 2-chloro-2, 6-dimethyl-13-ethyl-pentadecene-6 and the like. Such halides may be used as the pure or substantially pure individuals or as mixtures thereof with or without other compounds which may be inert or may undergo simultaneous reaction without interfering with the production of the desired mercaptan or mercaptans.

Another method of producing the new mercaptans is by reaction of salts of the corresponding alkyl acid esters of sulphuric and phosphoric acid with a hydrosulphide. Thus, for example, sodium octadecyl-9 sulphate reacts with sodium acid sulphide to give octadecyl-9-mercaptan and sodium di-(tridecyl-3) phosphate gives tridecyl-3-mercaptan under similar conditions. U. S. Patents 2,139,393 and 2,139,394 describe particularly advantageous methods of preparing salts of alkyl sulphates and phosphates of 10 or more carbon atoms per molecule which are suitable starting materials for the compounds of the present invention.

Reduction of the corresponding disulphides provides another method of producing the new mercaptans. The reduction may be carried out with iron and sulphuric acid, tin and hydrochloric acid or catalytically. Diheptadecyl-8 disulphide, for example, may be converted in this way to heptadecyl-8-mercaptan. Unsymmetrical disulphides may be used as well as symmetrical disulphides. Copending application Serial No. 337,324, filed May 25, 1940, describes a large number of disulphides which may be similarly converted to mercaptans.

Reaction of secondary and tertiary alkyl halides of ten or more carbon atoms with thiourea, or of the corresponding dithiocarbonates with sodium hydroxide may also be used to prepare the new mercaptans. Particularly when saturated mercaptans are desired, they may be obtained by reacting olefinic mixtures comprising olefines having at least 10 carbon atoms in a straight chain with hydrogen sulphide in accordance with U. S. Patent 2,052,268.

The new mercaptans of the invention are capable of a wide variety of advantageous uses. They may be employed as corrosion inhibitors, particularly in acid pickling baths and in the acid cleaning of oil wells and the like. They are also useful in separation of minerals by the froth flotation or the like. They are especially advantageous intermediates in the production of other valuable organic compounds. They may be converted by mild oxidation to disulfides which may be employed in rubber compounding. On more vigorous oxidation, for example with nitric acid, the new mercaptans form sulphonic acids which have especially advantageous surface active properties and are unusually effective textile wetting and foaming agents. This reaction is more fully described and claimed along with the new sulphonates obtained thereby in copending application Serial No. 286,156, filed July 24, 1939, of which the present application is a continuation-in-part. Sulphones, sulphonium compounds and the like may also be prepared from the new mercaptans.

The new mercaptans readily react with alkali metals forming sodium, potassium and like mercaptides. When added to mercuric oxide or to an alcoholic solution of mercuric chloride, they form mercury mercaptides which are advantageous parasiticides. The corresponding lead and copper mercaptides are useful components of insecticides and the like.

Another type of derivative within the scope of the invention is the thio-esters which may be regarded as formed by addition of organic acids to the new mercaptans with splitting out of water. Thio-esters corresponding to fatty acids such as formic, acetic, propionic, isobutyric, stearic, oleic, methacrylic, lactic and like acids may be produced as well as those derived from aromatic and polycarboxylic acids such as benzoic acid, oxalic acid, tartaric acid and the like. These new compounds may be conveniently produced, for example, by reacting the new mercaptans with acid halides of the organic acid which it is desired to combine with the mercaptan. Thus, for example, acetyl chloride may be reacted with tetradecyl-2-mercaptan, and the corresponding thioacetate obtained. These new thio-esters are solvents, plasticizers and the like and may be employed for the synthesis of other new compounds.

The following examples show methods of producing typical mercaptans of the invention and are intended to be illustrative only.

Example I

A dodecene was obtained by dehydrating with 10% of concentrated sulphuric acid at 140°–145° C. a secondary dodecyl alcohol obtained from cracked wax olefines. From analysis the dodecene appeared to be close to 100% pure. It boiled at 95° C. under 15 mm. pressure and had a density of 0.7582 (20/4).

This dodecene was reacted with hydrogen sulphide at 280° C. and 1800 to 2000 lbs. pressure in the presence of 7% acetic anhydride and 7% of nickel sulphide on pumice as catalyst. The mercaptan cut from vacuum fractionation of the reaction products showed 93% mercaptan. This secondary mercaptan boils at 88° C. under 1 mm. pressure and at 112° C. at 5 mm. This mercaptan was oxidized by adding it to a 50% aqueous solution of nitric acid, vigorously agitated and kept at 70° C. and a secondary sodium sulphonate obtained by neutralization of the resulting upper layer. This sulphonate analyzed 51.0% carbon, 9.5% hydrogen, 11.1% sulphur, 8.31% sodium and (by difference) 20.1% oxygen.

Example II

Tri-isobutylene was reacted at 200° C. with hydrogen sulphide under about 2000 pounds pressure for nine hours. The resulting tertiary dodecyl mercaptan was quite unstable and decomposed when treated with alcoholic lead acetate. It may be recovered from the reaction products by vacuum distillation or preferably by extraction with ethyl ether.

Example III

A $C_{16}$ fraction of cracked wax olefines boiling around 132° C. at 5 mm. and having an average molecular weight of 220 was reacted in 1000 cc. batches in a horizontal autoclave with hydrogen sulphide at 280° C. for 5 hours with agitation using finely divided nickel converted to nickel sulphide in situ as the catalyst in an amount equal to 5% of the weight of the olefine. About 50% conversion to the secondary mercaptan boiling at 130° C. under 1 mm. pressure was obtained.

Among the preferred mercaptans of the invention are secondary saturated mercaptans such as decyl-5-mercaptan, undecyl-4-mercaptan, 2,9-dimethyl-decyl-5-mercaptan, 3-ethyl-undecyl-6-mercaptan, tetradecyl-3-mercaptan, tetradecyl-4-mercaptan, tetradecyl-5-mercaptan, tetradecyl-6-mercaptan, tetradecyl-7-mercaptan, 2,4,8-trimethyl-dodecyl-6-mercaptan, hexadecyl-7-mercaptan and the like, tertiary saturated mercaptans, for example, 3-methyl-decyl-3-mercaptan, 4-methyl-undecyl-4-mercaptan, 6-methyl-3-ethyl-decyl-6-mercaptan, 8-methyl-pentadecyl-8-mercaptan, 7-methyl-tridecyl-7-mercaptan and the like and unsaturated mercaptans such as 1-methyl-6-heptene-thiol, 1-methyl-8-dodecenethiol, 1-ethyl-7-hexadecenethiol, 1-methyl-1-ethyl-3-butenethiol, 1,1-diethyl-3-methyl-3-butenethiol, 1-methyl-1-propyl-5-dodecenethiol, etc.

It will thus be seen that a wide variety of valuable mercaptans, mercaptides and thio-esters are within the scope of the invention which is not limited to the compounds specifically described by way of illustration.

We claim as our invention:

1. A normal, secondary hexadecyl monothiol.
2. A secondary alkyl monothiol containing less than 17 carbon atoms per molecule and at least 10 carbon atoms in a straight chain.
3. Secondary aliphatic monothiols of the general formula RSH in which R represents a secondary open chain saturated aliphatic hydrocarbon radical containing 11 to 20 carbon atoms.
4. A secondary aliphatic mono-olefinic monothiol having 10 to 20 carbon atoms per molecule in which the thiol group is attached to a carbon atom to which two saturated carbon atoms are directly attached.
5. An aliphatic secondary monomercaptide having a thiol sulphur atom directly attached to a carbon atom to which two aliphatic radicals forming an open chain of 10 to 20 carbon atoms are also directly attached.
6. A thio-ester of an aliphatic secondary monothiol having a thiol group directly attached to a carbon atom to which two aliphatic radicals forming an open chain of 10 to 20 carbon atoms are also directly attached.
7. An aliphatic sulphur compound having a single thiol sulphur atom to which is directly attached a cation and a secondary carbon atom to which two aliphatic radicals forming an open chain of 10 to 20 carbon atoms are also directly attached.

MARTIN DE SIMÓ.
JOHN J. O'CONNOR.